(12) United States Patent
Fujimoto et al.

(10) Patent No.: US 11,460,482 B2
(45) Date of Patent: Oct. 4, 2022

(54) SENSOR WITH FIXED AND MOVBLE COMPONENTS

(71) Applicant: KABUSHIKI KAISHA TOSHIBA, Tokyo (JP)

(72) Inventors: Akira Fujimoto, Kawasaki Kanagawa (JP); Hideyuki Tomizawa, Ota Gumma (JP); Akiko Yuzawa, Kawasaki Kanagawa (JP); Naofumi Nakamura, Setagaya Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 92 days.

(21) Appl. No.: 16/815,148

(22) Filed: Mar. 11, 2020

(65) Prior Publication Data

US 2021/0063432 A1    Mar. 4, 2021

(30) Foreign Application Priority Data

Aug. 28, 2019   (JP) .............................. JP2019-155985

(51) Int. Cl.
*G01P 15/125*    (2006.01)
*G01P 15/08*    (2006.01)

(52) U.S. Cl.
CPC .... *G01P 15/125* (2013.01); *G01P 2015/0831* (2013.01); *G01P 2015/0848* (2013.01)

(58) Field of Classification Search
CPC .... G01P 15/125; G01P 15/18; G01P 15/0802; G01P 2015/0831; G01P 2015/0848
See application file for complete search history.

(56) References Cited

U.S. PATENT DOCUMENTS

| 7,210,352 B2* | 5/2007 | Foster ................... G01P 15/125 73/514.32 |
| 7,258,010 B2* | 8/2007 | Horning ................. H02N 1/008 73/504.14 |
| 7,418,864 B2* | 9/2008 | Asami ................... B81B 3/0086 73/514.32 |
| 2006/0185433 A1* | 8/2006 | Leonardson .......... G01P 15/125 73/514.32 |

(Continued)

FOREIGN PATENT DOCUMENTS

| JP | 2007-248466 A | 9/2007 |
| JP | 2016-197060 A | 11/2016 |
| WO | WO 2010/032818 A1 | 3/2010 |

*Primary Examiner* — Helen C Kwok
(74) *Attorney, Agent, or Firm* — Finnegan, Henderson, Farabow, Garrett & Dunner L.L.P.

(57) ABSTRACT

According to one embodiment, a sensor includes a base body, a first movable structure body, and a first fixed structure body. The first movable structure body includes first movable electrodes. A direction from the base body toward the first movable electrodes is aligned with a first direction. A distance between the base body and the plurality of first movable electrodes is changeable. A direction from one of the first movable electrodes toward an other one of the first movable electrodes is aligned with a second direction crossing the first direction. The first fixed structure body includes first fixed electrodes. One of the first fixed electrodes is between the one of the first movable electrodes and the other one of the first movable electrodes. A first movable electrode length along the first direction is shorter than a first fixed electrode length along the first direction.

13 Claims, 10 Drawing Sheets

(56) References Cited

U.S. PATENT DOCUMENTS

| | | | |
|---|---|---|---|
| 2006/0277997 A1* | 12/2006 | Foster | G01P 15/18 |
| | | | 73/514.32 |
| 2007/0214891 A1* | 9/2007 | Robert | G01P 15/18 |
| | | | 73/514.32 |
| 2010/0024552 A1* | 2/2010 | Foster | G01P 15/131 |
| | | | 73/514.29 |
| 2012/0167681 A1* | 7/2012 | Reinmuth | B81B 3/0078 |
| | | | 73/504.12 |
| 2013/0125649 A1* | 5/2013 | Simoni | G01P 15/125 |
| | | | 73/504.04 |
| 2015/0029690 A1* | 1/2015 | Tanaka | G01P 15/125 |
| | | | 361/777 |
| 2016/0041198 A1* | 2/2016 | Tanaka | B81B 3/0008 |
| | | | 73/514.32 |
| 2016/0293336 A1 | 10/2016 | Fujimoto | |
| 2017/0363656 A1* | 12/2017 | Fang | G01P 15/125 |
| 2018/0031603 A1* | 2/2018 | Huang | G01P 15/14 |
| 2020/0132714 A1* | 4/2020 | Matsuura | G01P 15/125 |
| 2020/0166536 A1* | 5/2020 | Takizawa | G01P 15/0802 |

* cited by examiner

SENSOR WITH FIXED AND MOVBLE COMPONENTS

CROSS-REFERENCE TO RELATED APPLICATIONS

This application is based upon and claims the benefit of priority from Japanese Patent Application No. 2019-155985, filed on Aug. 28, 2019; the entire contents of which are incorporated herein by reference

FIELD

Embodiments described herein relate generally to a sensor.

BACKGROUND

For example, there is a sensor that utilizes a MEMS structure. It is desirable for the detection capability of the sensor to be high.

DETAILED DESCRIPTION

Figure 1:
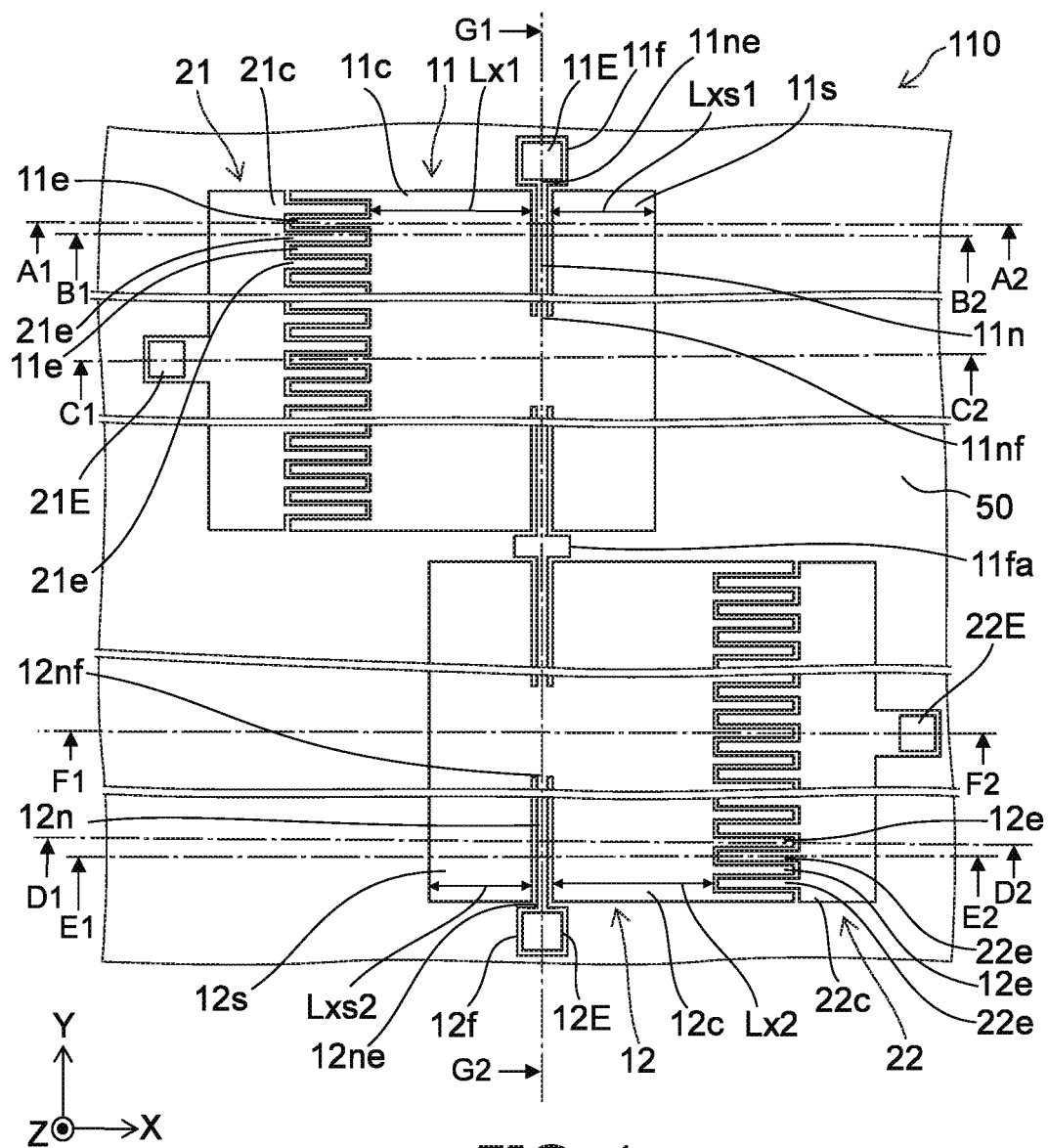
FIG. 1 is a schematic view illustrating a sensor according to a first embodiment.

According to one embodiment, a sensor includes a base body, a first movable structure body, and a first fixed structure body. The first movable structure body includes a plurality of first movable electrodes. A direction from the base body toward the plurality of first movable electrodes is aligned with a first direction. A distance between the base body and the plurality of first movable electrodes is changeable. A direction from one of the plurality of first movable electrodes toward an other one of the plurality of first movable electrodes is aligned with a second direction crossing the first direction. The first fixed structure body includes a plurality of first fixed electrodes. One of the plurality of first fixed electrodes is between the one of the plurality of first movable electrodes and the other one of the plurality of first movable electrodes. A first movable electrode length along the first direction of the one of the plurality of first movable electrodes is shorter than a first fixed electrode length along the first direction of the one of the plurality of first fixed electrodes.

According to another embodiment, a sensor includes a base body, a first movable structure body, a first fixed structure body, a second movable structure body, and a second fixed structure body. The first movable structure body includes a plurality of first movable electrodes. A direction from the base body toward the plurality of first movable electrodes is aligned with a first direction. A distance between the base body and the plurality of first movable electrodes is changeable. A direction from one of the plurality of first movable electrodes toward an other one of the plurality of first movable electrodes is aligned with a second direction crossing the first direction. The first fixed structure body includes a plurality of first fixed electrodes. One of the plurality of first fixed electrodes is between the one of the plurality of first movable electrodes and the other one of the plurality of first movable electrodes. The second movable structure body includes a plurality of second movable electrodes. A distance between the base body and the plurality of second movable electrodes is changeable. A direction from one of the plurality of second movable electrodes toward an other one of the plurality of second movable electrodes is aligned with the second direction. The second fixed structure body includes a plurality of second fixed electrodes. One of the plurality of second fixed electrodes is between the one of the plurality of second movable electrodes and the other one of the plurality of second movable electrodes. A first electrostatic capacitance between the plurality of first movable electrodes and the plurality of first fixed electrodes when a first acceleration is applied is smaller than a second electrostatic capacitance between the plurality of first movable electrodes and the plurality of first fixed electrodes when the first acceleration is not applied. A third electrostatic capacitance between the plurality of second movable electrodes and the plurality of second fixed electrodes when a second acceleration is applied is smaller than a fourth electrostatic capacitance between the plurality of second movable electrodes and the plurality of second fixed electrodes when the second acceleration is not applied. The second acceleration has a component in a reverse orientation of an orientation of the first acceleration. An absolute value of a difference between a fifth electrostatic capacitance and a sixth electrostatic capacitance is less than an absolute value of a difference between the first electrostatic capacitance and the second electrostatic capacitance. The fifth electrostatic capacitance is between the plurality of first movable electrodes and the plurality of first fixed electrodes when the second acceleration is applied. The sixth electrostatic capacitance is between the plurality of first movable electrodes and the plurality of first fixed electrodes when the second acceleration is not applied. An absolute value of a difference between a seventh electrostatic capacitance and an eighth electrostatic capacitance is less than an absolute value of a difference between the third electrostatic capacitance and the fourth electrostatic capacitance. The seventh electrostatic capacitance is between the plurality of second movable electrodes and the plurality of second fixed electrodes when the first acceleration is applied. The eighth electrostatic capacitance is between the plurality of second movable electrodes and the plurality of second fixed electrodes when the first acceleration is not applied.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

First Embodiment

FIG. 1, FIG. 2A to FIG. 2C, FIG. 3A to FIG. 3C, and FIG. 4 are schematic views illustrating a sensor according to a first embodiment.

Figure 2A:
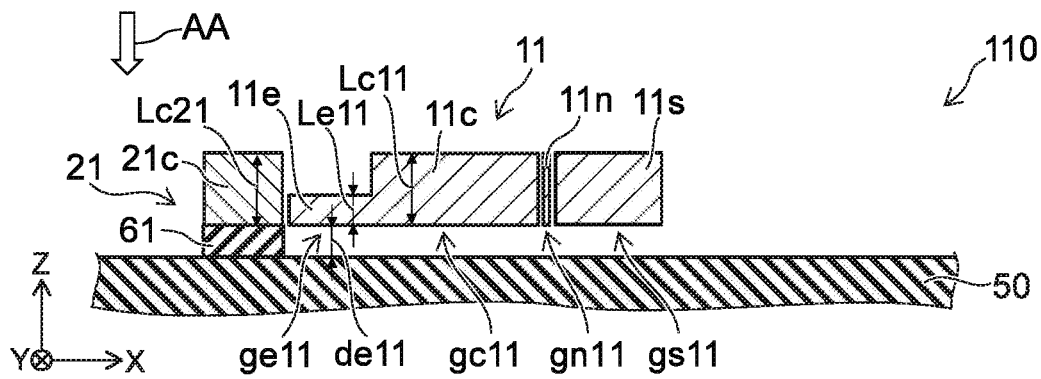
FIG. 2A to FIG. 2C are schematic views illustrating the sensor according to the first embodiment.
Figure 2B:
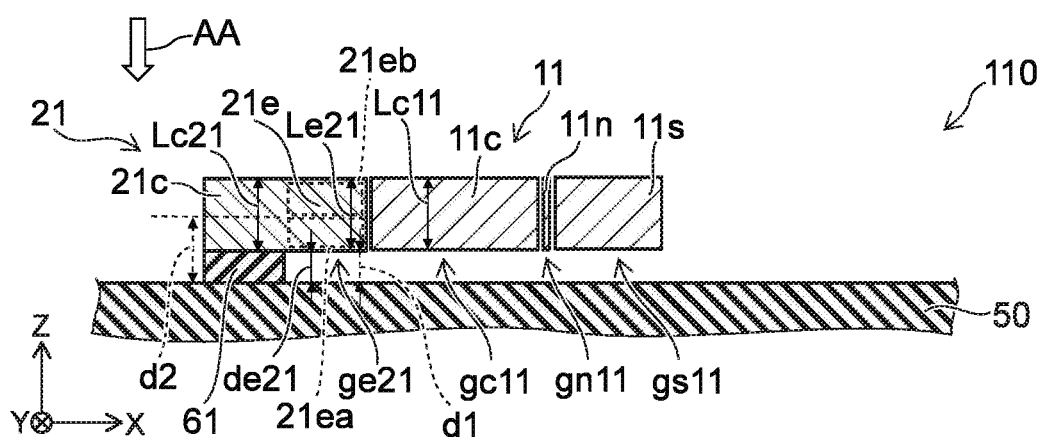
Figure 2C:
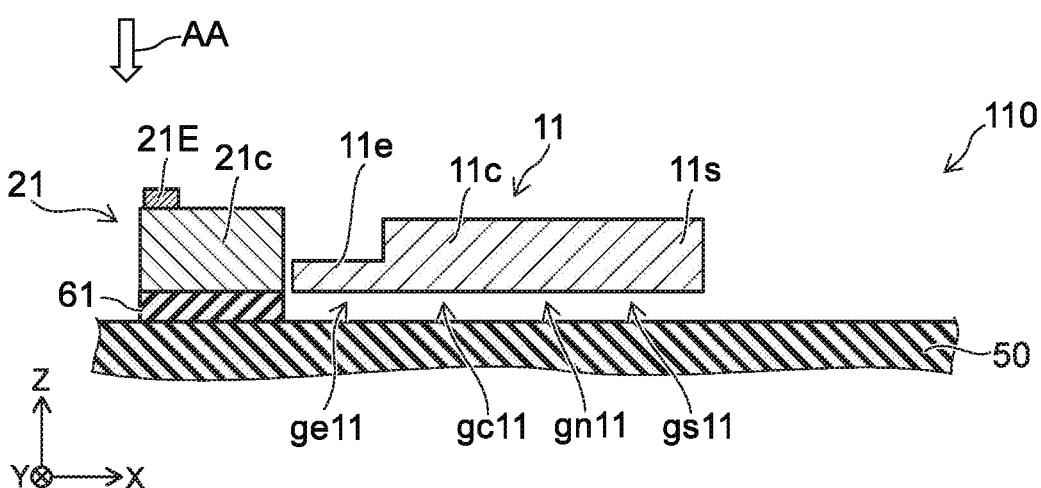
Figure 3A:
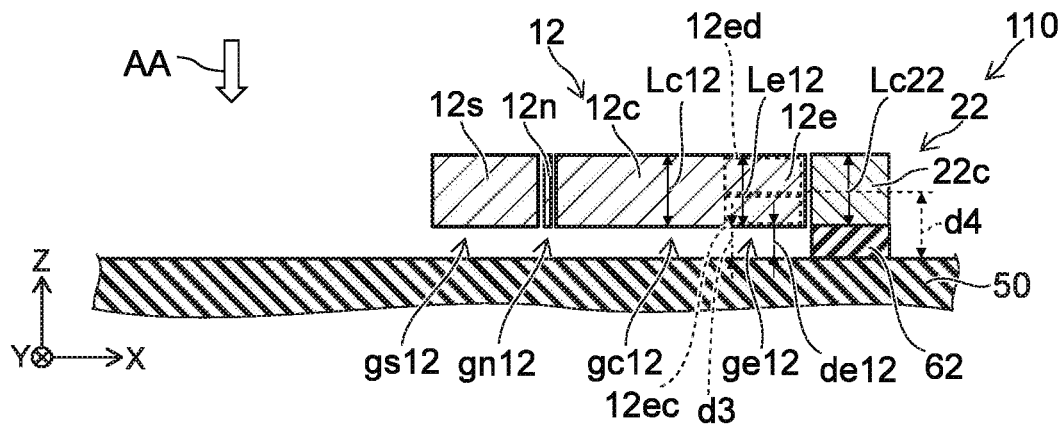
FIG. 3A to FIG. 3C are schematic views illustrating the sensor according to the first embodiment.
Figure 3B:
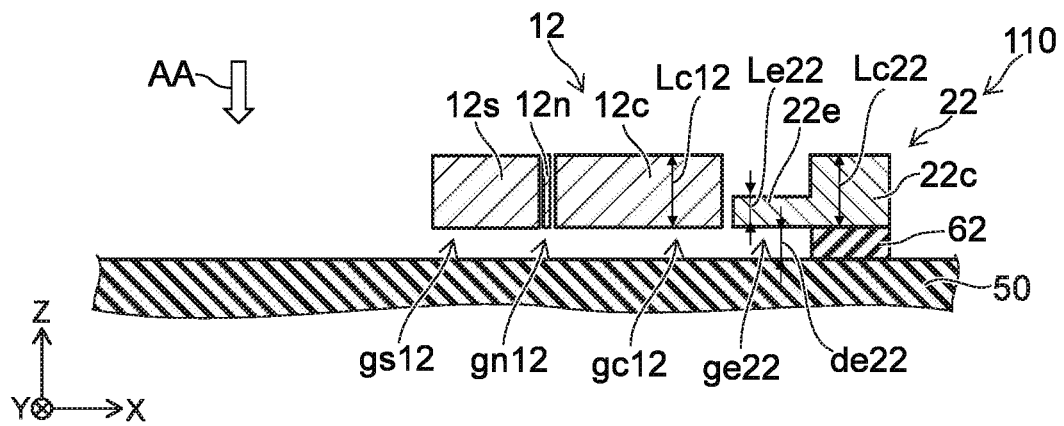
Figure 3C:
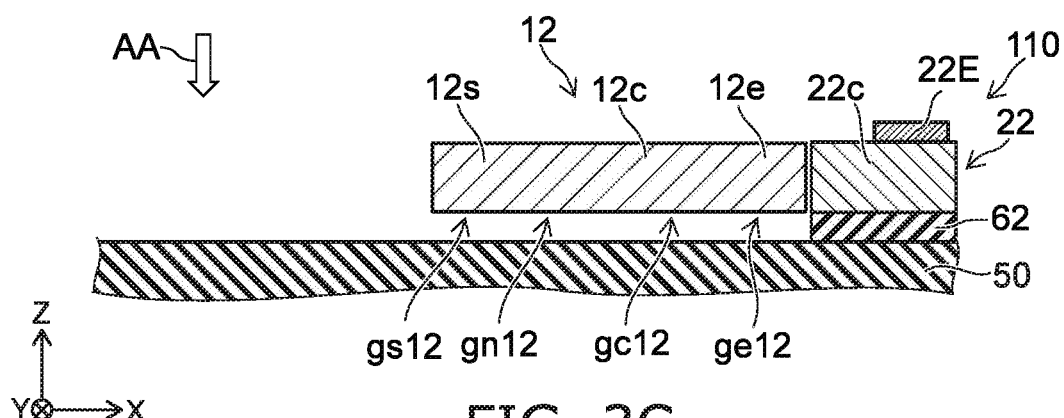
Figure 4:
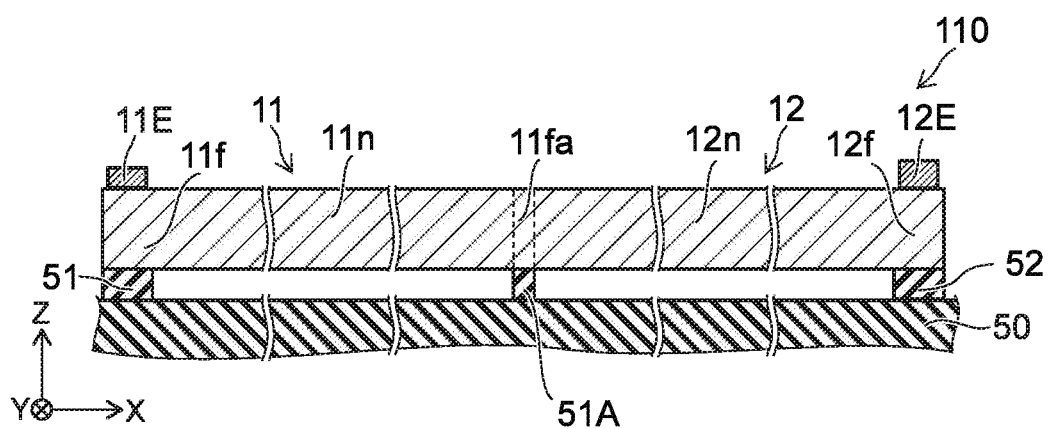
FIG. 4 is a schematic view illustrating the sensor according to the first embodiment.

FIG. 1A is a plan view as viewed along arrow AA of FIG. 2A to FIG. 2C. FIG. 2A to FIG. 2C respectively are cross-sectional views along line A1-A2 of FIG. 1, line B1-B2, and line C1-C2. FIG. 3A to FIG. 3C respectively are cross-sectional views along line D1-D2 of FIG. 1, line E1-E2, and line F1-F2. FIG. 4 is a cross-sectional view along line G1-G2 of FIG. 1.

As shown in FIG. 1, the sensor 110 according to the embodiment includes a base body 50, a first movable structure body 11, and a first fixed structure body 21. In the example, the sensor 110 further includes a second movable structure body 12 and a second fixed structure body 22.

The first movable structure body 11 includes multiple first movable electrodes 11e. As shown in FIG. 2A, a gap ge11 is provided between the base body 50 and the multiple first movable electrodes 11e.

The direction from the base body 50 toward the multiple first movable electrodes 11e is taken as a first direction. The first direction is taken as a Z-axis direction. One direction perpendicular to the Z-axis direction is taken as an X-axis direction. A direction perpendicular to the Z-axis direction and the X-axis direction is taken as a Y-axis direction.

A distance de11 between the base body 50 and the multiple first movable electrodes 11e along the first direction (the Z-axis direction) is changeable. For example, the multiple first movable electrodes 11e are displaced with respect to the base body 50 when an acceleration is applied to the sensor. The distance de1 changes when the acceleration is applied.

As shown in FIG. 1, the direction from one of the multiple first movable electrodes 11e toward another one of the multiple first movable electrodes 11e is aligned with a second direction. The second direction crosses the first direction. The second direction is, for example, the Y-axis direction. Thus, the multiple first movable electrodes 11e are arranged along the second direction (the Y-axis direction).

As shown in FIG. 1, the first fixed structure body 21 includes multiple first fixed electrodes 21e. One of the multiple first fixed electrodes 21e is between the one of the multiple first movable electrodes 11e and the other one of the multiple first movable electrodes 11e. For example, the first movable electrode 11e and the first fixed electrode 21e are arranged alternately along the Y-axis direction. The multiple first movable electrodes 11e and the multiple first fixed electrodes 21e are, for example, comb electrodes.

In the example as shown in FIG. 2B, a gap ge21 is provided between the base body 50 and the multiple first fixed electrodes 21e. For example, a distance de21 between the base body 50 and the multiple first fixed electrodes 21e is substantially fixed.

For example, when the acceleration is applied, the multiple first movable electrodes 11e are displaced; but the multiple first fixed electrodes 21e substantially are not displaced. Therefore, the electrostatic capacitance between the multiple first movable electrodes 11e and the multiple first fixed electrodes 21e when the acceleration is applied changes from the electrostatic capacitance between the multiple first movable electrodes 11e and the multiple first fixed electrodes 21e when the acceleration is not applied. For example, the electrostatic capacitance between the multiple first movable electrodes 11e and the multiple first fixed electrodes 21e changes according to the change of the distance de1 between the base body 50 and the multiple first movable electrodes 11e. For example, the acceleration can be detected by detecting the change of the electrostatic capacitance. An external force that is applied to the sensor 110, etc., can be detected by detecting the change of the electrostatic capacitance. The sensor 110 is, for example, a MEMS (Micro Electro Mechanical Systems) sensor.

As shown in FIG. 2A, the length (the thickness) along the first direction (the Z-axis direction) of one of the multiple first movable electrodes 11e is taken as a first movable electrode length Le11. As shown in FIG. 2B, the length (the thickness) along the first direction (the Z-axis direction) of one of the multiple first fixed electrodes 21e is taken as a first fixed electrode length Le21. In the embodiment as shown in FIG. 2A and FIG. 2B, the first movable electrode length Le11 is shorter than the first fixed electrode length Le21.

For example, as shown in FIG. 2B, one of the multiple first fixed electrodes 21e includes a first partial region 21ea and a second partial region 21eb. The first partial region 21ea overlaps one of the multiple first movable electrodes 11e in the second direction (the Y-axis direction). The second partial region 21eb does not overlap the one of the multiple first movable electrodes 11e in the second direction. The first partial region 21ea opposes the one of the multiple first movable electrodes 11e in the second direction (the Y-axis direction). The second partial region 21eb does not oppose the one of the multiple first movable electrodes 11e in the second direction.

As shown in FIG. 2B, the distance along the first direction (the Z-axis direction) between the base body 50 and the first partial region 21ea is taken as a first distance d1. The distance along the first direction (the Z-axis direction) between the base body 50 and the second partial region 21eb is taken as a second distance d2. The first distance d1 is different from the second distance d2. In the example, the first distance d1 is shorter than the second distance d2.

Thus, one of the multiple first fixed electrodes 21e includes the first partial region 21ea opposing one of the multiple first movable electrodes 11e, and the second partial region 21eb not opposing the one of the multiple first movable electrodes 11e. By such a configuration, a case where the surface area of one of the multiple first fixed electrodes 21e opposing one of the multiple first movable electrodes 11e changes and a case where the surface area does not change occur between when the orientation of the applied acceleration has a component in the orientation from the base body 50 toward the multiple first movable electrodes 11e and when the orientation of the applied acceleration has a component in the reverse orientation. Information that relates to the orientation of the applied acceleration can be obtained thereby.

According to the embodiment, for example, the orientation of the acceleration can be detected. According to the embodiment, a sensor that has a high detection capability can be provided. Examples of the detection of the orientation of the acceleration are described below.

An example of the first movable structure body 11 will now be described.

As shown in FIG. 2A, the first movable structure body 11 includes a first movable conductive portion 11c. For example, the first movable conductive portion 11c is separated from the base body 50 in the first direction (the Z-axis direction). A gap gc11 is provided between the base body 50 and the first movable conductive portion 11c. As shown in FIG. 1, the multiple first movable electrodes 11e are held by the first movable conductive portion 11c. For example, the multiple first movable electrodes 11e are connected to the first movable conductive portion 11c. As shown in FIG. 2A, the length along the first direction (the Z-axis direction) of the first movable conductive portion 11c is taken as a first movable conductive portion length Lc11. For example, the first movable electrode length Le11 is shorter than the first movable conductive portion length Lc11. Thus, the thickness of the portion of the first movable structure body 11 forming the comb electrode may be selectively thin.

As shown in FIG. 4, the first movable structure body 11 may include a first fixed portion 11f. The first fixed portion 11f is fixed to the base body 50. In the example, the sensor 110 may further include a first insulating portion 51. The first insulating portion 51 is provided between the base body 50 and the first fixed portion 11f. As shown in FIG. 1, the first movable conductive portion 11c is held by the first fixed portion 11f. The first movable conductive portion 11c is connected to the first fixed portion 11f. In the example, the first movable conductive portion 11c is held by the first fixed portion 11f via a first movable connection portion 11n.

Thus, the first movable structure body 11 may include the first movable connection portion 11n (referring to FIG. 1). The first movable connection portion 11n connects the first fixed portion 11f and the first movable conductive portion 11c. As shown in FIG. 4, the first movable connection portion 11n is separated from the base body 50 in the first direction (the Z-axis direction). As shown in FIG. 1, the first movable connection portion 11n and the first movable conductive portion 11c extend along the second direction (e.g., the Y-axis direction). As shown in FIG. 1, one end portion 11ne of the first movable connection portion 11n is fixed to the first fixed portion 11f. Another end portion 11nf of the first movable connection portion 11n is connected to the first movable conductive portion 11c.

In the example as shown in FIG. 1, the first movable structure body 11 further includes a first movable structure portion 11s. The other end portion 11nf of the first movable connection portion 11n recited above is connected also to the first movable structure portion 11s. A direction crossing a plane (the Z-Y plane) including the first direction and the second direction is taken as a third direction. The third direction is, for example, the X-axis direction. A length Lx1 of the first movable conductive portion 11c along the third direction (the X-axis direction) is different from a length Lxs1 of the first movable structure portion 11s along the third direction. In the example, the length Lx1 of the first movable conductive portion 11c along the third direction is longer than the length Lxs1 of the first movable structure portion 11s along the third direction. By providing the first movable structure portion 11s, for example, the multiple first movable electrodes 11e can be displaced quickly when the acceleration is applied. For example, the acceleration can be detected with high responsiveness.

As shown in FIG. 2A and FIG. 2B, the first movable connection portion 11n is separated from the base body 50 in the Z-axis direction. A gap gn11 is provided between the base body 50 and the first movable connection portion 11n. The first movable structure portion 11s is separated from the base body 50 in the Z-axis direction. A gap gs11 is provided between the base body 50 and the first movable structure portion 11s. The first movable connection portion 11n is, for example, a torsion spring member.

A first movable electrode pad 11E may be provided as shown in FIG. 1 and FIG. 4. The first movable electrode pad 11E is electrically connected to the multiple first movable electrodes 11e. In the example, the first movable electrode pad 11E is electrically connected to the multiple first movable electrodes 11e via the first movable connection portion 11n and the first movable conductive portion 11c.

An example of the first fixed structure body 21 will now be described.

As shown in FIG. 1, the first fixed structure body 21 may include a first fixed conductive portion 21c. The first fixed conductive portion 21c holds the multiple first fixed electrodes 21e. The multiple first fixed electrodes 21e are connected to the first fixed conductive portion 21c. As shown in FIG. 2B, a first fixed insulating portion 61 may be provided between the base body 50 and the first fixed conductive portion 21c. The first fixed conductive portion 21c is fixed to the base body 50 by the first fixed insulating portion 61.

As shown in FIG. 2B, the length of the first fixed conductive portion 21c along the first direction (the Z-axis direction) is taken as a first fixed conductive portion length Lc21. For example, the first fixed conductive portion length Lc21 may be the same as the first fixed electrode length Le21. As shown in FIG. 2A, for example, the first movable electrode length Le11 may be shorter than the first fixed conductive portion length Lc21.

A first fixed electrode pad 21E may be provided as shown in FIG. 1 and FIG. 2C. The first fixed electrode pad 21E is electrically connected to the multiple first fixed electrodes 21e. In the example, the first fixed electrode pad 21E is electrically connected to the multiple first fixed electrodes 21e via the first fixed conductive portion 21c.

As shown in FIG. 1, the sensor 110 may further include the second movable structure body 12 and the second fixed structure body 22. The second movable structure body 12 includes multiple second movable electrodes 12e.

As shown in FIG. 3A, the multiple second movable electrodes 12e are separated from the base body 50 in the first direction (the Z-axis direction). A gap ge12 is provided between the base body 50 and the multiple second movable electrodes 12e. A distance between the base body 50 and the multiple second movable electrodes 12e is changeable. As shown in FIG. 1, the direction from one of the multiple second movable electrodes 12e toward another one of the multiple second movable electrodes 12e is aligned with the second direction (the Y-axis direction).

As shown in FIG. 1, the second fixed structure body 22 includes multiple second fixed electrodes 22e. One of the multiple second fixed electrodes 22e is between the one of the multiple second movable electrodes 12e and the other one of the multiple second movable electrodes 12e. For example, the second movable electrode 12e and the second fixed electrode 22e are arranged alternately along the Y-axis direction.

In the example as shown in FIG. 3B, a gap ge22 is provided between the base body 50 and the multiple second fixed electrodes 22e. A distance de22 along the first direction (the Z-axis direction) between the base body 50 and the multiple second fixed electrodes 22e is substantially fixed.

For example, when the acceleration is applied, the multiple second movable electrodes 12e are displaced; and the multiple second fixed electrodes 22e substantially are not displaced. Therefore, the electrostatic capacitance between the multiple second movable electrodes 12e and the multiple second fixed electrodes 22e when the acceleration is applied changes from the electrostatic capacitance between the multiple second movable electrodes 12e and the multiple second fixed electrodes 22e when the acceleration is not applied. For example, the electrostatic capacitance between the multiple second movable electrodes 12e and the multiple second fixed electrodes 22e changes according to the change of the distance de12 between the base body 50 and the multiple second movable electrodes 12e. For example, the acceleration can be detected by detecting the change of the electrostatic capacitance.

As shown in FIG. 3B, the length along the first direction (the Z-axis direction) of one of the multiple second fixed electrodes 22e is taken as a second fixed electrode length Le22. As shown in FIG. 3A, the length along the first direction (the Z-axis direction) of one of the multiple second movable electrodes 12e is taken as a second movable electrode length Le12. As shown in FIG. 3A and FIG. 3B, the second fixed electrode length Le22 is shorter than the second movable electrode length Le12.

For example, as shown in FIG. 3A, one of the multiple second movable electrodes 12e includes a third partial region 12ec and a fourth partial region 12ed. The third partial region 12ec overlaps one of the multiple second fixed electrodes 22e in the second direction (the Y-axis direction). The fourth partial region 12ed does not overlap the one of the multiple second fixed electrodes 22e in the second direction (the Y-axis direction). The third partial region 12ec opposes the one of the multiple second fixed electrodes 22e in the second direction (the Y-axis direction). The fourth partial region 12ed does not oppose the one of the multiple second fixed electrodes 22e in the second direction.

As shown in FIG. 3A, the distance along the first direction (the Z-axis direction) between the base body 50 and the third partial region 12ec is taken as a third distance d3. The distance along the first direction (the Z-axis direction) between the base body 50 and the fourth partial region 12ed is taken as a fourth distance d4. The third distance d3 is different from the fourth distance d4. In the example, the third distance d3 is shorter than the fourth distance d4.

Thus, one of the multiple second movable electrodes 12e includes the third partial region 12ec opposing one of the multiple second fixed electrodes 22e, and the fourth partial region 12ed not opposing the one of the multiple second fixed electrodes 22e. By such a configuration, a case where the surface area of one of the multiple second movable electrodes 12e opposing one of the multiple second fixed electrodes 22e changes and a case where the surface area does not change occur between when the orientation of the applied acceleration has a component in the orientation from the base body 50 toward the multiple second movable electrodes 12e and when the orientation of the applied acceleration has a component in the reverse orientation. Information that relates to the orientation of the applied acceleration can be obtained thereby.

According to the embodiment, for example, the orientation of the acceleration can be detected. According to the embodiment, a sensor that has a high detection capability can be provided. The orientation of the acceleration can be detected by performing differential processing by using a set including the first movable structure body 11 and the first fixed structure body 21 such as those recited above and a set including the second movable structure body 12 and the second fixed structure body 22 such as those recited above. Examples of the detection of the orientation of the acceleration are described below.

An example of the second movable structure body 12 will now be described.

As shown in FIG. 3A, for example, the second movable structure body 12 includes a second movable conductive portion 12c. For example, the second movable conductive portion 12c is separated from the base body 50 in the first direction (the Z-axis direction). A gap gc12 is provided between the base body 50 and the second movable conductive portion 12c. As shown in FIG. 1, the multiple second movable electrodes 12e are held by the second movable conductive portion 12c. The multiple second movable electrodes 12e are connected to the second movable conductive portion 12c. As shown in FIG. 3A, the length along the first direction (the Z-axis direction) of the second movable conductive portion 12c is taken as a second movable conductive portion length Lc12. The second movable electrode length Le12 may be substantially the same as the second movable conductive portion length Lc12.

As shown in FIG. 4, the second movable structure body 12 may include a second fixed portion 12f. The second fixed portion 12f is fixed to the base body 50. In the example, the sensor 110 may further include a second insulating portion 52. The second insulating portion 52 is provided between the base body 50 and the second fixed portion 12f. As shown in FIG. 1, the second movable conductive portion 12c is held by the second fixed portion 12f. The second movable conductive portion 12c is connected to the second fixed portion 12f. In the example, the second movable conductive portion 12c is held by the second fixed portion 12f via a second movable connection portion 12n.

Thus, the second movable structure body 12 may include the second movable connection portion 12n (referring to FIG. 1). The second movable connection portion 12n connects the second fixed portion 12f and the second movable conductive portion 12c. As shown in FIG. 4, the second movable connection portion 12n is separated from the base body 50 in the first direction (the Z-axis direction). As shown in FIG. 1, the second movable connection portion 12n and the second movable conductive portion 12c extend along the second direction (e.g., the Y-axis direction). As shown in FIG. 1, one end portion 12ne of the second movable connection portion 12n is fixed to the second fixed portion 12f. Another end portion 12nf of the second movable connection portion 12n is connected to the second movable conductive portion 12c.

In the example as shown in FIG. 1, the second movable structure body 12 further includes a second movable structure portion 12s. The other end portion 12nf of the second movable connection portion 12n recited above is connected also to the second movable structure portion 12s. A length Lx2 of the second movable conductive portion 12c along the third direction (e.g., the X-axis direction) crossing a plane (the Z-Y plane) including the first direction and the second direction is different from a length Lxs2 of the second movable structure portion 12s along the third direction. In the example, the length Lx2 is longer than the length Lxs2. By providing the second movable structure portion 12s, for example, the multiple second movable electrodes 12e can be displaced quickly when the acceleration is applied. For example, the acceleration can be detected with high responsiveness.

As shown in FIG. 3A and FIG. 3B, the second movable connection portion 12n is separated from the base body 50 in the Z-axis direction. A gap gn12 is provided between the base body 50 and the second movable connection portion 12n. The second movable structure portion 12s is separated from the base body 50 in the Z-axis direction. A gap gs12 is provided between the base body 50 and the second movable structure portion 12s. The second movable connection portion 12n is, for example, a torsion spring member.

A second movable electrode pad 12E may be provided as shown in FIG. 1 and FIG. 4. The second movable electrode pad 12E is electrically connected to the multiple second movable electrodes 12e. In the example, the second movable electrode pad 12E is electrically connected to the multiple second movable electrodes 12e via the second movable connection portion 12n and the second movable conductive portion 12c.

In the example, an intermediate connection portion 11fa is provided between the first movable connection portion 11n and the second movable connection portion 12n. The intermediate connection portion 11fa is fixed to the base body 50 by an insulating member 51A.

An example of the second fixed structure body 22 will now be described.

As shown in FIG. 1, the second fixed structure body 22 may include a second fixed conductive portion 22c. The second fixed conductive portion 22c holds the multiple second fixed electrodes 22e. The multiple second fixed electrodes 22e are connected to the second fixed conductive portion 22c. As shown in FIG. 3B, a second fixed insulating portion 62 may be provided between the base body 50 and the second fixed conductive portion 22c. The second fixed conductive portion 22c is fixed to the base body 50 by the second fixed insulating portion 62.

As shown in FIG. 3B, the length of the second fixed conductive portion 22c along the first direction (the Z-axis direction) is taken as a second fixed conductive portion length Lc22. For example, the second fixed electrode length Le22 is shorter than the second fixed conductive portion length Lc22. Thus, the thickness of the portion of the second fixed structure body 22 forming the comb electrode may be selectively thin. For example, the second fixed conductive portion length Lc22 may be the same as the second fixed electrode length Le22.

A second fixed electrode pad 22E may be provided as shown in FIG. 1 and FIG. 3C. The second fixed electrode pad 22E is electrically connected to the multiple second fixed electrodes 22e. In the example, the second fixed electrode pad 22E is electrically connected to the multiple second fixed electrodes 22e via the second fixed conductive portion 22c.

An example of operations of the sensor 110 will now be described.

FIG. 5A to FIG. 5F are schematic views illustrating operations of the sensor according to the first embodiment.

Figure 5A:
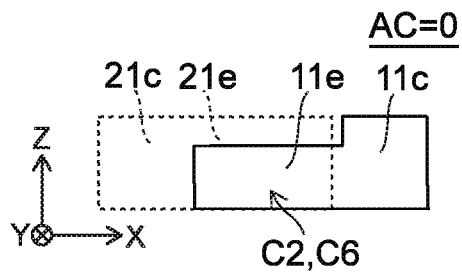
FIG. 5A to FIG. 5F are schematic views illustrating operations of the sensor according to the first embodiment.
Figure 5D:
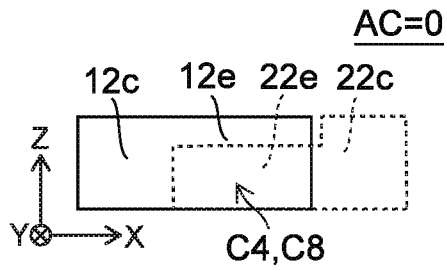
Figure 5B:
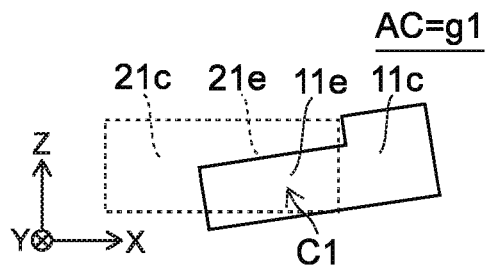
Figure 5E:
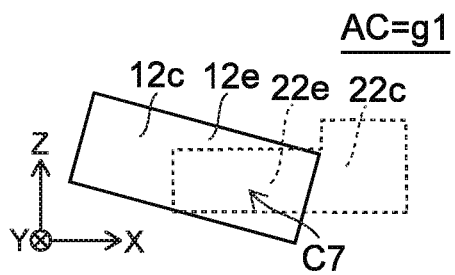
Figure 5C:
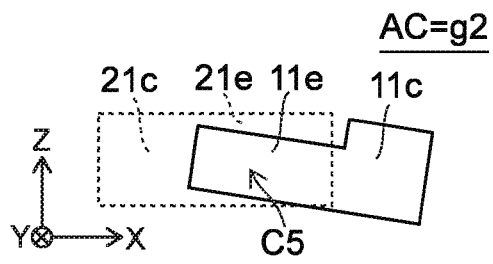
Figure 5F:
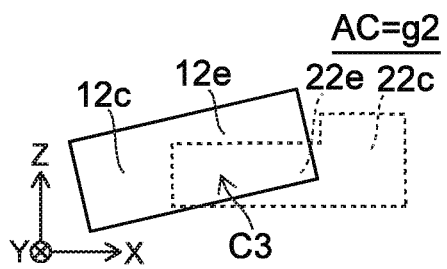

FIG. 5A to FIG. 5C illustrate one of the multiple first movable electrodes 11e and one of the multiple first fixed electrodes 21e. FIG. 5D to FIG. 5F illustrate one of the multiple second movable electrodes 12e and one of the multiple second fixed electrodes 22e. FIG. 5A and FIG. 5D correspond to a state in which the acceleration is not applied (an acceleration AC=0).

FIG. 5B and FIG. 5E correspond to a state in which a first acceleration g1 is applied in one orientation. FIG. 5C and FIG. 5F correspond to a state in which a second acceleration g2 is applied in another orientation. The second acceleration g2 has a component in the reverse orientation of the orientation of the first acceleration g1.

As shown in FIG. 5B, the surface area of the first movable electrode 11e and the first fixed electrode 21e opposing each other when the first acceleration g1 is applied decreases from the surface area in the state (the state of FIG. 5A) in which the first acceleration g1 is not applied. As shown in FIG. 5C, the surface area of the first movable electrode 11e and the first fixed electrode 21e opposing each other when the second acceleration g2 is applied in the reverse orientation is substantially the same as the surface area in the state (the state of FIG. 5A) in which the second acceleration g2 is not applied.

As shown in FIG. 5E, the surface area of the second movable electrode 12e and the second fixed electrode 22e opposing each other when the first acceleration g1 is applied is substantially the same as the surface area in the state (the state of FIG. 5D) in which the first acceleration g1 is not applied. As shown in FIG. 5F, the surface area of the second movable electrode 12e and the second fixed electrode 22e opposing each other when the second acceleration g2 is applied in the reverse orientation decreases from the surface area in the state (the state of FIG. 5D) in which the second acceleration g2 is not applied.

It can be seen that the first acceleration g1 is applied when the electrostatic capacitance between the first movable electrode 11e and the first fixed electrode 21e decreases. It can be seen that the second acceleration g2 is applied when the electrostatic capacitance between the second movable electrode 12e and the second fixed electrode 22e decreases.

Thus, the orientation of the applied acceleration can be detected in the sensor 110. According to the embodiment, a sensor that has a high detection capability can be provided.

For example, the electrostatic capacitance between the multiple first movable electrodes 11e and the multiple first fixed electrodes 21e when the first acceleration g1 is applied is taken as a first electrostatic capacitance C1 (referring to FIG. 5B). The electrostatic capacitance between the multiple first movable electrodes 11e and the multiple first fixed electrodes 21e when the first acceleration g1 is not applied is taken as a second electrostatic capacitance C2 (referring to FIG. 5A). The first electrostatic capacitance C1 is smaller than the second electrostatic capacitance C2.

The electrostatic capacitance between the multiple second movable electrodes 12e and the multiple second fixed electrodes 22e when the second acceleration g2 having a component reverse to the first acceleration g1 is applied is taken as a third electrostatic capacitance C3 (referring to FIG. 5F). The electrostatic capacitance between the multiple second movable electrodes 12e and the multiple second fixed electrodes 22e when the second acceleration g2 is not applied is taken as a fourth electrostatic capacitance C4 (referring to FIG. 5D). The third electrostatic capacitance C3 is smaller than the fourth electrostatic capacitance C4.

The electrostatic capacitance between the multiple first movable electrodes 11e and the multiple first fixed electrodes 21e when the second acceleration g2 is applied is taken as a fifth electrostatic capacitance C5 (referring to FIG. 5C). The electrostatic capacitance between the multiple first movable electrodes 11e and the multiple first fixed electrodes 21e when the second acceleration g2 is not applied is taken as a sixth electrostatic capacitance C6 (referring to FIG. 5A). For example, the sixth electrostatic capacitance C6 is substantially the same as the second electrostatic capacitance C2. The absolute value of the difference between the fifth electrostatic capacitance C5 and the sixth electrostatic capacitance C6 is less than the absolute value of the difference between the first electrostatic capacitance C1 and the second electrostatic capacitance C2.

The electrostatic capacitance between the multiple second movable electrodes 12e and the multiple second fixed electrodes 22e when the first acceleration g1 is applied is taken as a seventh electrostatic capacitance C7 (referring to FIG. 5E). The electrostatic capacitance between the multiple second movable electrodes 12e and the multiple second fixed electrodes 22e when the first acceleration g1 is not applied is taken as an eighth electrostatic capacitance C8 (referring to FIG. 5D). For example, the eighth electrostatic capacitance C8 is substantially the same as the fourth electrostatic capacitance C4. The absolute value of the difference between the seventh electrostatic capacitance C7 and the eighth electrostatic capacitance C8 is less than the absolute value of the difference between the third electrostatic capacitance C3 and the fourth electrostatic capacitance C4.

By such a configuration, information that relates to the orientation of the acceleration can be obtained.

In the embodiment, the first movable electrode length Le11 (referring to FIG. 2A) is, for example, not less than $1/10$ and not more than $99/100$ of the first fixed electrode length Le21 (referring to FIG. 2B). By setting the first movable electrode length Le11 to be not more than $99/100$ of the first fixed electrode length Le21, for example, the change of the electrostatic capacitance due to the orientation of the acceleration is sufficiently large. By setting the first movable electrode length Le11 to be not less than $1/10$ of the first fixed electrode length Le21, the patterning of the configuration of the first movable electrode 11e is stable.

The second fixed electrode length Le22 (referring to FIG. 3B) is not less than $1/10$ and not more than $99/100$ of the second movable electrode length Le12 (referring to FIG. 3A). By setting the second fixed electrode length Le22 to be not more than $99/100$ of the second movable electrode length Le12, for example, the change of the electrostatic capacitance due to the orientation of the acceleration is sufficiently large. By setting the second fixed electrode length Le22 to be not less than $1/10$ of the second movable electrode length Le12, the patterning of the configuration of the second fixed electrode 22e is stable.

The first fixed electrode length Le21 is, for example, about 10 μm. In such a case, the first movable electrode length Le11 is not less than 1 μm and not more than 9.9 μm. The second movable electrode length Le12 is, for example, about 10 μm. In such a case, the second fixed electrode length Le22 is not less than 1 μm and not more than 9.9 m.

Figure 6:
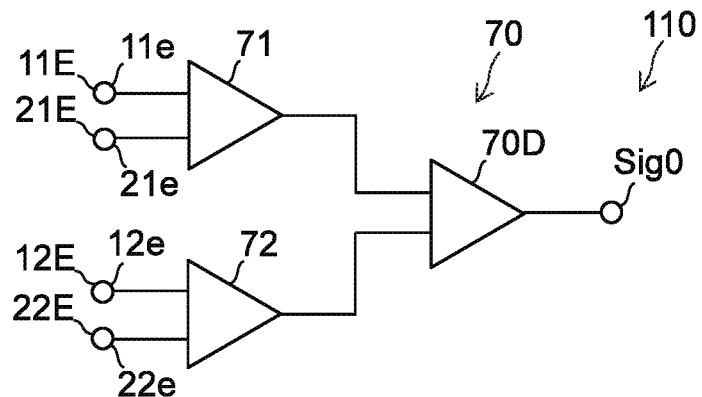
FIG. 6 is a schematic view illustrating a portion of the sensor according to the first embodiment.

FIG. 6 is a schematic view illustrating a portion of the sensor according to the first embodiment.

As shown in FIG. 6, the sensor 110 may include a detector 70. The detector 70 includes a differential circuit 70D. For example, the detector 70 includes a first circuit 71 and a second circuit 72.

The first movable electrode pad 11E (the multiple first movable electrodes 11e) is electrically connected to one input of the first circuit 71. The first fixed electrode pad 21E (the multiple first fixed electrodes 21e) is electrically connected to another input of the first circuit 71. A signal that corresponds to the electrostatic capacitance between the multiple first movable electrodes 11e and the multiple first fixed electrodes 21e is obtained from the first circuit 71.

The second movable electrode pad 12E (the multiple second movable electrodes 12e) is electrically connected to one input of the second circuit 72. The second fixed electrode pad 22E (the multiple second fixed electrodes 22e) is electrically connected to another input of the second circuit 72. A signal that corresponds to the electrostatic capacitance between the multiple second movable electrodes 12e and the multiple second fixed electrodes 22e is obtained from the second circuit 72.

The output of the first circuit 71 and the output of the second circuit 72 are supplied to the differential circuit 70D. A signal Sig0 that corresponds to the difference between the output of the first circuit 71 and the output of the second circuit 72 is output from the differential circuit 70D. For example, the polarity of the signal Sig0 corresponds to the orientation of the acceleration.

Figure 7:
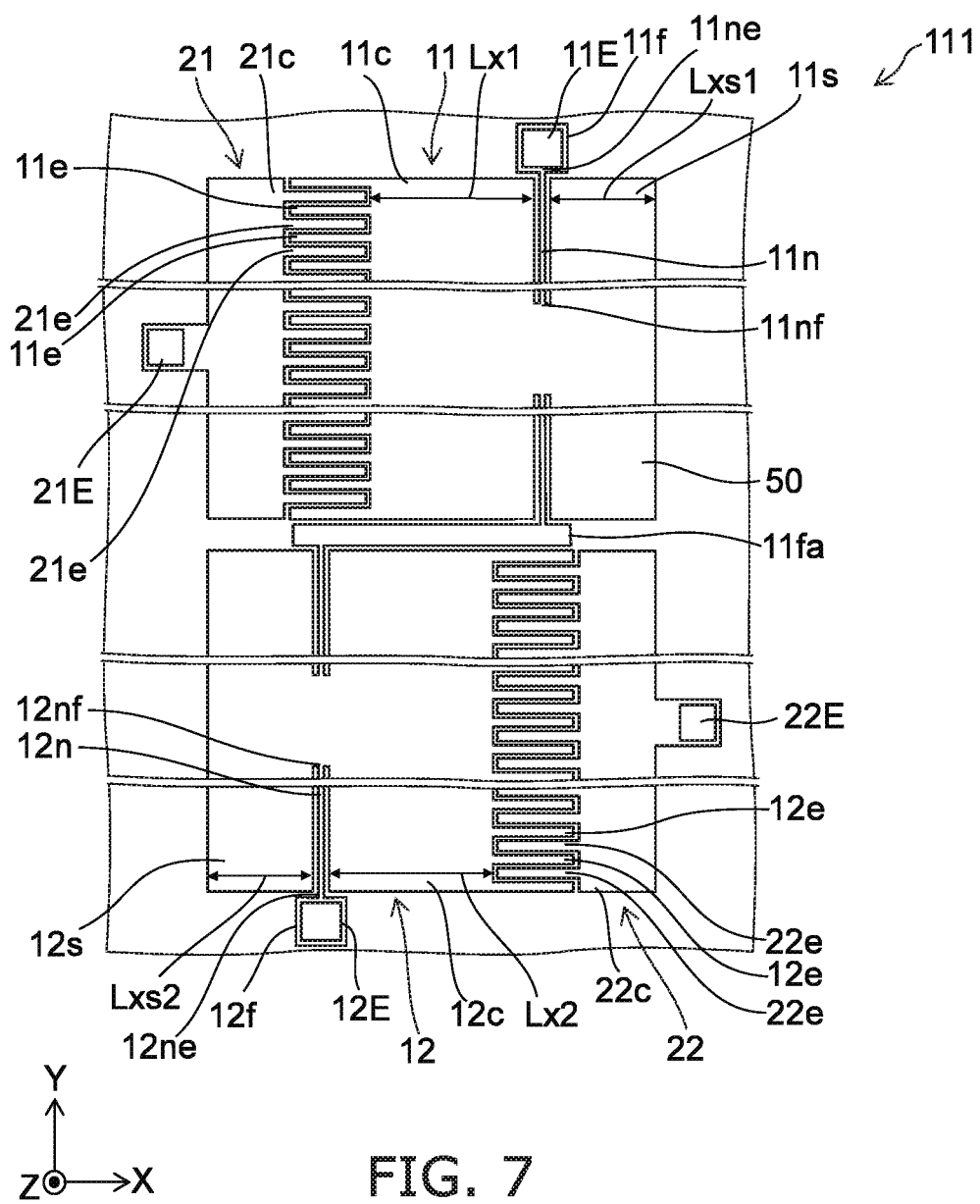
FIG. 7 is a schematic plan view illustrating a sensor according to the first embodiment.
Figure 8:
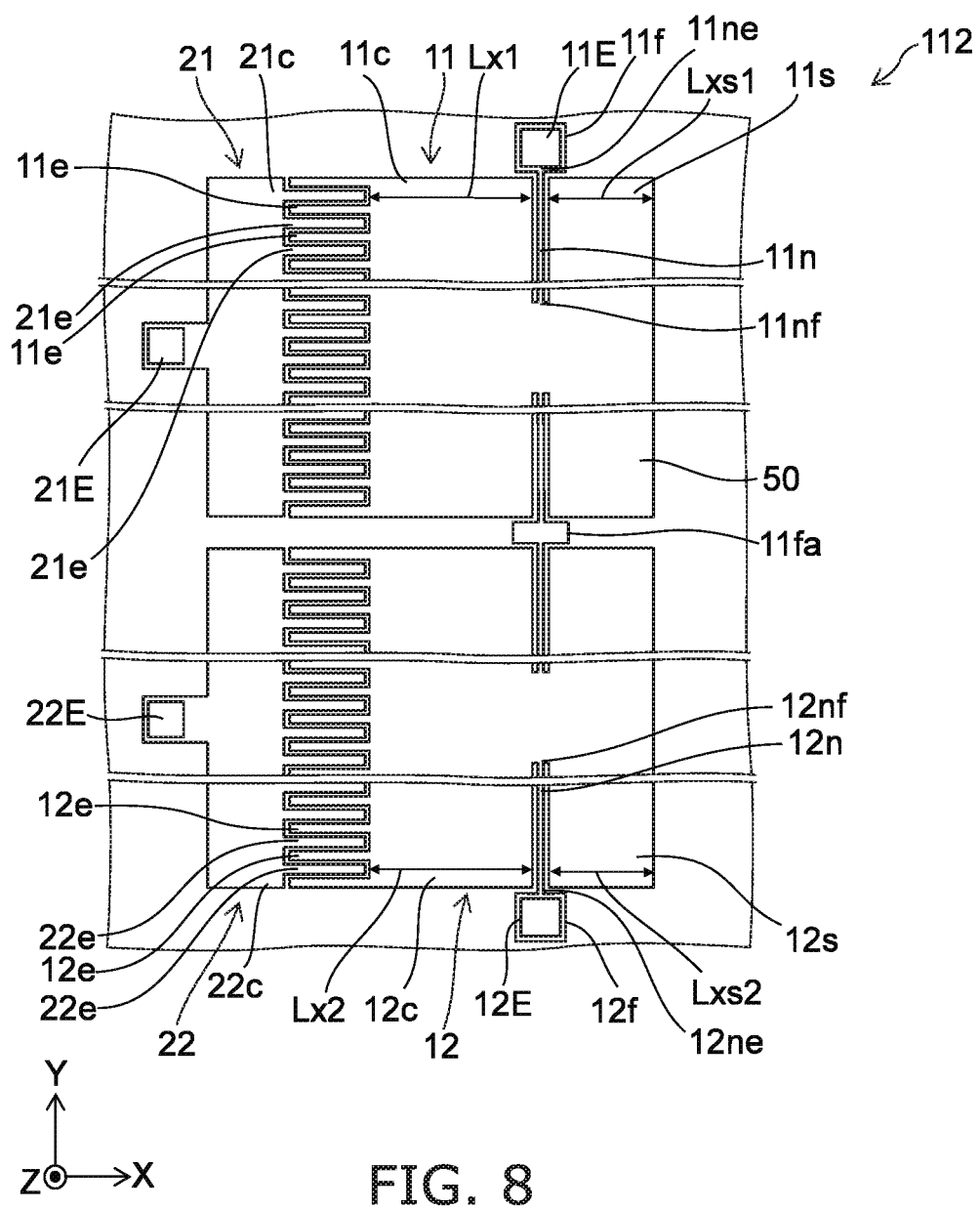
FIG. 8 is a schematic plan view illustrating a sensor according to the first embodiment.

FIG. 7 and FIG. 8 are schematic plan views illustrating sensors according to the first embodiment.

As shown in FIG. 7 and FIG. 8, the first movable structure body 11, the first fixed structure body 21, the second movable structure body 12, the second fixed structure body 22, etc., are provided also in sensors 111 and 112 according to the embodiment. For example, the arrangement in the X-Y plane of these structure bodies is arbitrary. The configurations described in reference to the structure bodies of the sensor 110 are applicable to these structure bodies. In the sensors 111 and 112 as well, for example, information that relates to the orientation of the acceleration can be obtained. For example, a sensor that has a high detection capability can be provided.

For example, when the distance de1 between the base body 50 and the multiple first movable electrodes 11e (referring to FIG. 2A) increases (referring to FIG. 5C), the distance de12 between the base body 50 and the multiple second movable electrodes 12e (referring to FIG. 3A) increases (referring to FIG. 5F). For example, when the distance de1 between the base body 50 and the multiple first movable electrodes 11e decreases (referring to FIG. 5B), the distance de12 between the base body 50 and the multiple second movable electrodes 12e decreases (referring to FIG. 5E).

Second Embodiment

FIG. 9A to FIG. 9C, FIG. 10A, and FIG. 10B are schematic views illustrating a sensor according to a second embodiment.

Figure 9A:
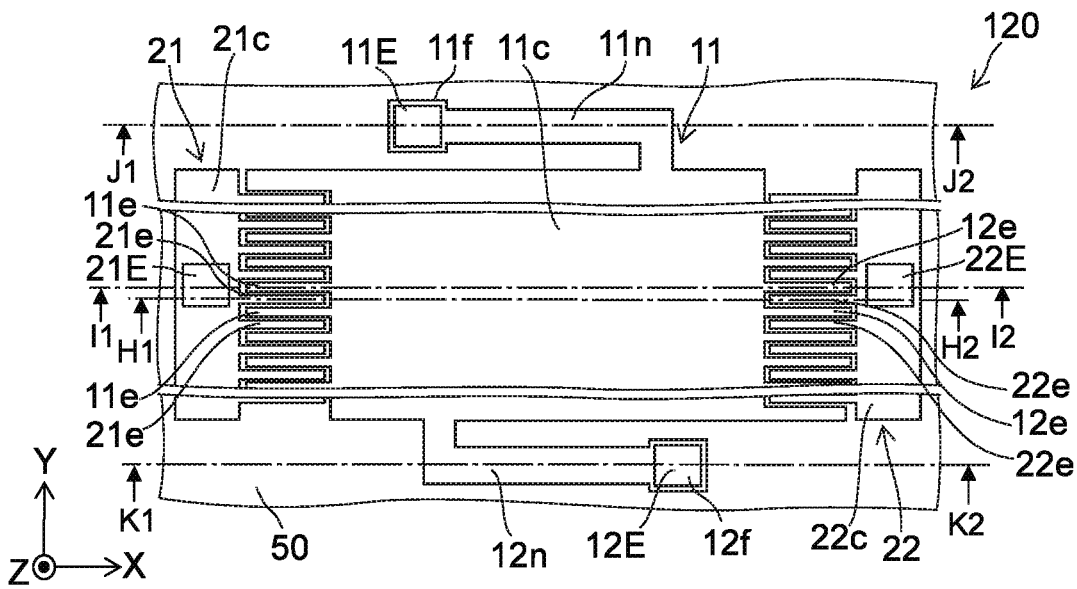
FIG. 9A to FIG. 9C are schematic views illustrating a sensor according to a second embodiment.
Figure 9B:
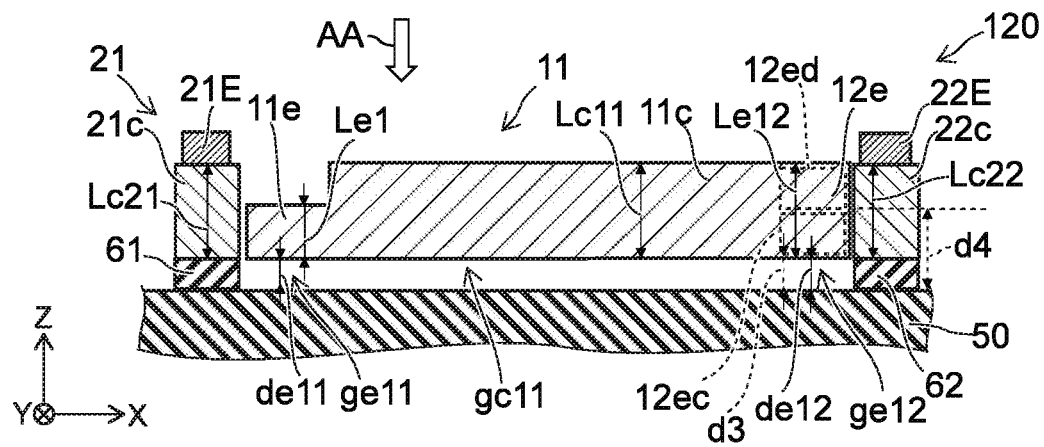
Figure 9C:
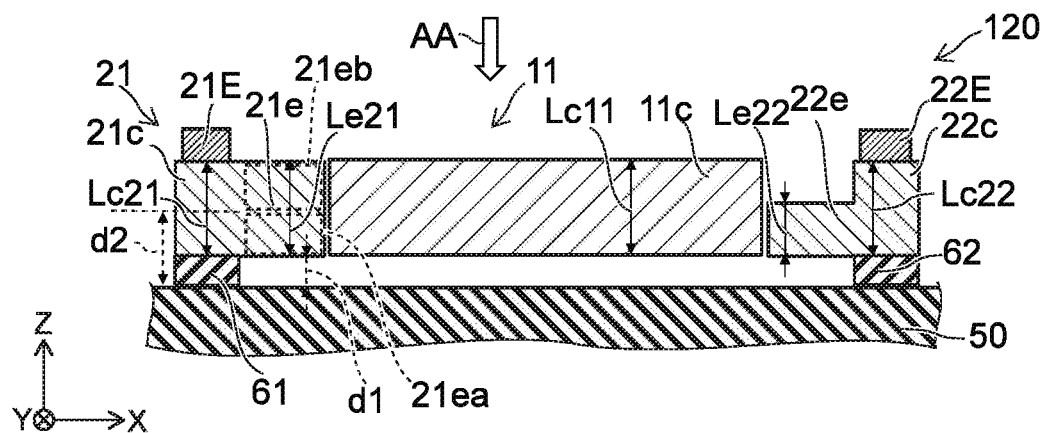
Figure 10A:
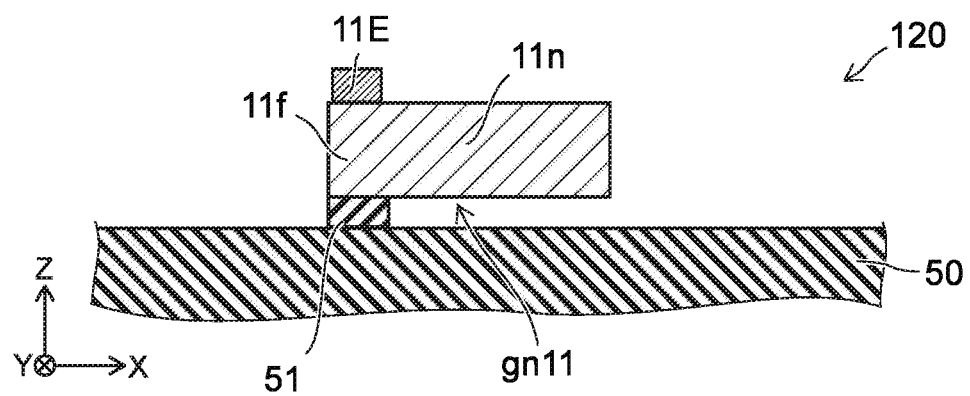
FIG. 10A and FIG. 10B are schematic views illustrating a sensor according to a second embodiment.
Figure 10B:
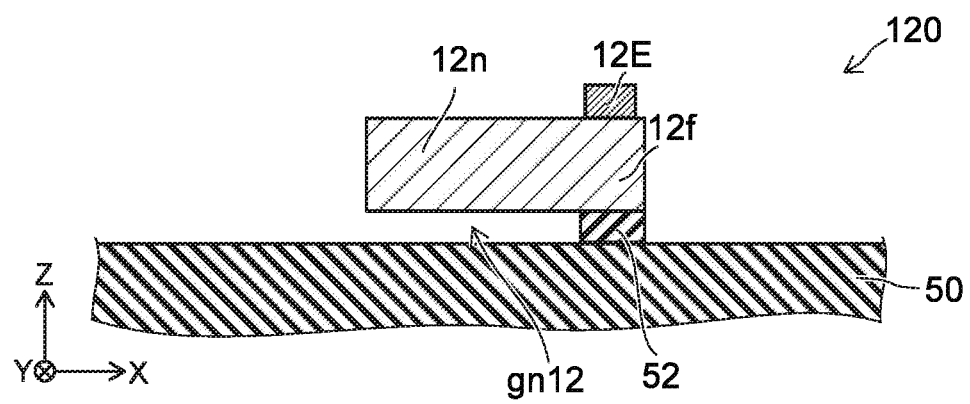

FIG. 9A is a plan view as viewed along arrow AA of FIG. 9B and FIG. 9C. FIG. 9B is a line H1-H2 cross-sectional view of FIG. 9A. FIG. 9C is a line I1-I2 cross-sectional view of FIG. 9A. FIG. 10A is a line J1-J2 cross-sectional view of FIG. 9A. FIG. 10B is a line K1-K2 cross-sectional view of FIG. 9A.

As shown in FIG. 9A, the sensor 120 according to the embodiment includes the base body 50, the first movable structure body 11, the first fixed structure body 21, and the second fixed structure body 22. The second fixed structure body 22 includes the multiple second fixed electrodes 22e.

In the example as well, the first movable structure body 11 includes the multiple first movable electrodes 11e. As shown in FIG. 9B, the direction from the base body 50 toward the multiple first movable electrodes 11e is aligned with the first direction (the Z-axis direction). The distance de1 between the base body 50 and the multiple first movable electrodes 11e is changeable. In the example as shown in FIG. 9A as well, the direction from one of the multiple first movable electrodes 11e toward another one of the multiple first movable electrodes 11e is aligned with the second direction crossing the first direction. The second direction is, for example, the Y-axis direction. In the example as well, the first fixed structure body 21 includes the multiple first fixed electrodes 21e. One of the multiple first fixed electrodes 21e is between the one of the multiple first movable electrodes 11e and the other one of the multiple first movable electrodes 11e.

As shown in FIG. 9A, the first movable structure body 11 includes the first fixed portion 11f, the first movable conductive portion 11c, and the multiple second movable electrodes 12e. As shown in FIG. 10A, the first fixed portion 11f is fixed to the base body 50 by the first insulating portion 51.

As shown in FIG. 9A, the first movable conductive portion 11c is held by the first fixed portion 11f. The multiple first movable electrodes 11e and the multiple second movable electrodes 12e are held by the first movable conductive portion 11c. The multiple first movable electrodes 11e and the multiple second movable electrodes 12e are connected to the first movable conductive portion 11c. As shown in FIG. 9B, the gap ge12 is provided between the base body 50 and the multiple second movable electrodes 12e. The distance de12 between the base body 50 and the multiple second movable electrodes 12e is changeable.

In the example as shown in FIG. 9A and FIG. 10A, the first movable conductive portion 11c is held by the first fixed portion 11f via the first movable connection portion 11n. The gap gn11 is provided between the base body 50 and the first movable connection portion 11n. The first movable electrode pad 11E is electrically connected to the first movable connection portion 11n. The first movable electrode pad 11E is electrically connected to the multiple first movable electrodes 11e.

As shown in FIG. 9A, the first movable structure body 11 includes the second fixed portion 12f and the second movable connection portion 12n. As shown in FIG. 10B, the second fixed portion 12f is fixed to the base body 50 by the second insulating portion 52. The second movable connection portion 12n is held by the second fixed portion 12f. The gap gn12 is provided between the base body 50 and the second movable connection portion 12n. The first movable conductive portion 11c is held by the second movable connection portion 12n. The second movable electrode pad 12E is electrically connected to the second movable connection portion 12n. The second movable electrode pad 12E is electrically connected to the multiple second movable electrodes 12e.

As shown in FIG. 9A, the direction from one of the multiple second movable electrodes 12e toward another one of the multiple second movable electrodes 12e is aligned with the second direction (e.g., the Y-axis direction).

The first movable conductive portion 11c is between the multiple first fixed electrodes 21e and the multiple second fixed electrodes 22e in the third direction (e.g., the X-axis direction) crossing a plane (e.g., the Z-Y plane) including the first direction and the second direction. The first movable conductive portion 11c is between at least a portion of the multiple first movable electrodes 11e and at least a portion of the multiple second movable electrodes 12e in the third direction (the X-axis direction).

As shown in FIG. 9A, one of the multiple second fixed electrodes 22e is between the one of the multiple second movable electrodes 12e and the other one of the multiple second movable electrodes 12e.

As shown in FIG. 9B and FIG. 9C, the first movable electrode length Le11 along the first direction (the Z-axis direction) of one of the multiple first movable electrodes 11e is shorter than the first fixed electrode length Le21 along the first direction of one of the multiple first fixed electrodes 21e.

As shown in FIG. 9B and FIG. 9C, the second fixed electrode length Le22 along the first direction of one of the multiple second fixed electrodes 22e is shorter than the second movable electrode length Le12 along the first direction of one of the multiple second movable electrodes 12e. In the sensor 120 as well, the orientation of the applied acceleration can be detected.

For example, as shown in FIG. 9C, one of the multiple first fixed electrodes 21e includes the first partial region 21ea and the second partial region 21eb. The first partial region 21ea overlaps one of the multiple first movable electrodes 11e in the second direction (the Y-axis direction). The second partial region 21eb does not overlap the one of the multiple first movable electrodes 11e in the second direction. The first partial region 21ea opposes the one of the multiple first movable electrodes 11e in the second direction (the Y-axis direction). The second partial region 21eb does not oppose the one of the multiple first movable electrodes 11e in the second direction.

As shown in FIG. 9C, the distance along the first direction (the Z-axis direction) between the base body 50 and the first partial region 21ea is taken as the first distance d1. The distance along the first direction (the Z-axis direction) between the base body 50 and the second partial region 21eb is taken as the second distance d2. The first distance d1 is different from the second distance d2. In the example, the first distance d1 is shorter than the second distance d2.

Due to the first partial region 21ea and the second partial region 21eb, a case where the surface area of one of the multiple first fixed electrodes 21e opposing one of the multiple first movable electrodes 11e changes and a case where the surface area does not change occur between when the orientation of the applied acceleration has a component in the orientation from the base body 50 toward the multiple first movable electrodes 11e and when the orientation of the applied acceleration has a component in the reverse orientation. Information that relates to the orientation of the applied acceleration can be obtained thereby.

For example, as shown in FIG. 9A, one of the multiple second movable electrodes 12e includes the third partial region 12ec and the fourth partial region 12ed. The third partial region 12ec overlaps one of the multiple second fixed electrodes 22e in the second direction (the Y-axis direction). The fourth partial region 12ed does not overlap the one of the multiple second fixed electrodes 22e in the second direction (the Y-axis direction). The third partial region 12ec opposes the one of the multiple second fixed electrodes 22e in the second direction (the Y-axis direction). The fourth partial region 12ed does not oppose the one of the multiple second fixed electrodes 22e in the second direction.

As shown in FIG. 9A, the distance along the first direction (the Z-axis direction) between the base body 50 and the third partial region 12ec is taken as the third distance d3. The distance along the first direction (the Z-axis direction) between the base body 50 and the fourth partial region 12ed is taken as the fourth distance d4. The third distance d3 is different from the fourth distance d4. In the example, the third distance d3 is shorter than the fourth distance d4.

Due to the third partial region 12ec and the fourth partial region 12ed, a case where the surface area of one of the multiple second movable electrodes 12e opposing one of the multiple second fixed electrodes 22e changes and a case where the surface area does not change occur between when the orientation of the applied acceleration has a component in the orientation from the base body 50 toward the multiple second movable electrodes 12e and when the orientation of the applied acceleration has a component in the reverse orientation. Information that relates to the orientation of the applied acceleration can be obtained thereby.

Figure 11A:
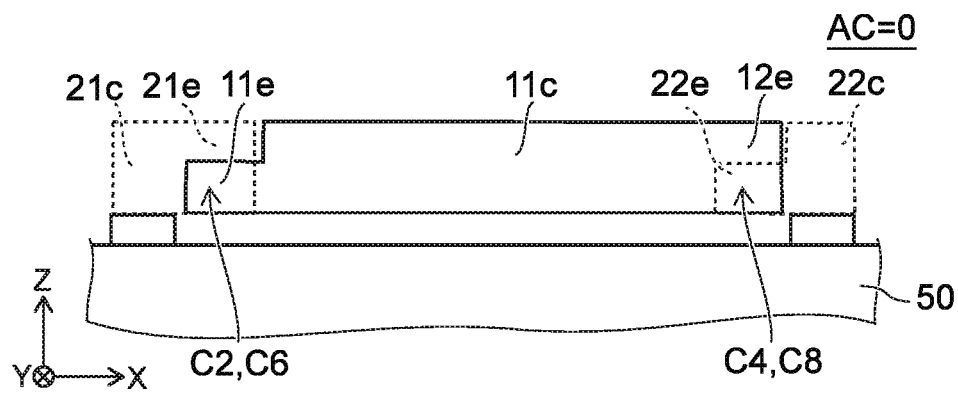
FIG. 11A to FIG. 11C are schematic views illustrating operations of the sensor according to the second embodiment.
Figure 11B:
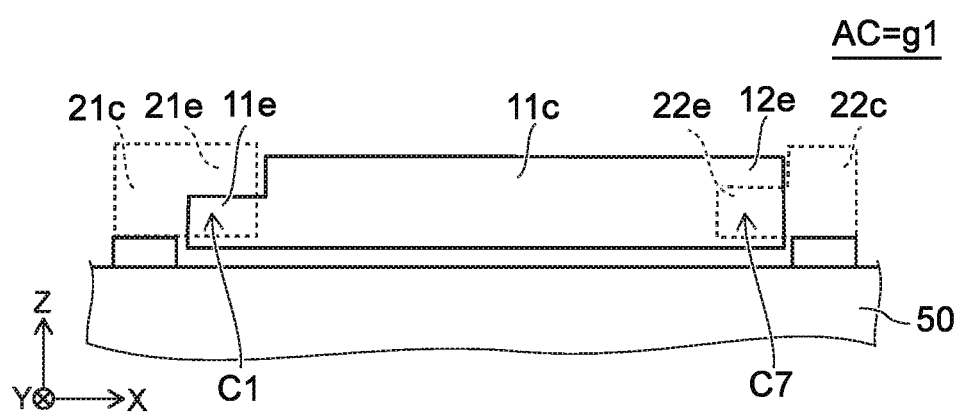
Figure 11C:
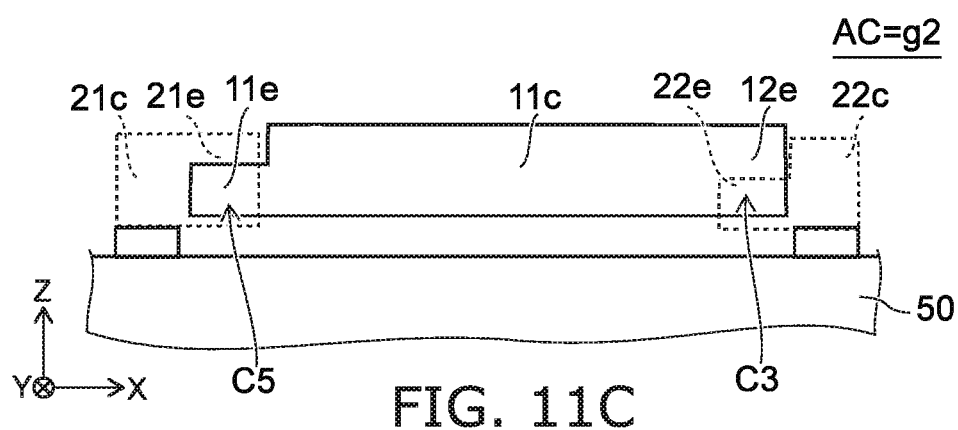

FIG. 11A to FIG. 11C are schematic views illustrating operations of the sensor according to the second embodiment.

FIG. 11A corresponds to a state in which the acceleration is not applied (the acceleration AC=0). FIG. 11B corresponds to a state in which the first acceleration g1 is applied in one orientation. FIG. 11C corresponds to a state in which the second acceleration g2 is applied in another orientation.

The second acceleration g2 has a component in the reverse orientation of the orientation of the first acceleration g1.

As shown in FIG. 11B, the surface area of the first movable electrode 11e and the first fixed electrode 21e opposing each other when the first acceleration g1 is applied decreases from the surface area in the state (the state of FIG. 11A) in which the first acceleration g1 is not applied. As shown in FIG. 11C, the surface area of the first movable electrode 11e and the first fixed electrode 21e opposing each other when the second acceleration g2 is applied in the reverse orientation is substantially the same as the surface area in the state (the state of FIG. 11A) in which the second acceleration g2 is not applied.

As shown in FIG. 11B, the surface area of the second movable electrode 12e and the second fixed electrode 22e opposing each other when the first acceleration g1 is applied is substantially the same as the surface area in the state (the state of FIG. 11A) in which the first acceleration g1 is not applied. As shown in FIG. 11C, the surface area of the second movable electrode 12e and the second fixed electrode 22e opposing each other when the second acceleration g2 is applied in the reverse orientation decreases from the surface area in the state (the state of FIG. 11A) in which the second acceleration g2 is not applied.

It can be seen that the first acceleration g1 is applied when the electrostatic capacitance between the first movable electrode 11e and the first fixed electrode 21e decreases. It can be seen that the second acceleration g2 is applied when the electrostatic capacitance between the second movable electrode 12e and the second fixed electrode 22e decreases.

Thus, in the sensor 120 as well, the orientation of the applied acceleration can be detected. According to the embodiment, a sensor that has a high detection capability can be provided.

The first electrostatic capacitance C1 between the multiple first movable electrodes 11e and the multiple first fixed electrodes 21e when the first acceleration g1 is applied (referring to FIG. 11B) is smaller than the second electrostatic capacitance C2 between the multiple first movable electrodes 11e and the multiple first fixed electrodes 21e when the first acceleration g1 is not applied (referring to FIG. 11A).

The third electrostatic capacitance C3 between the multiple second movable electrodes 12e and the multiple second fixed electrodes 22e when the second acceleration g2 having the component in the reverse orientation of the orientation of the first acceleration g1 is applied (referring to FIG. 11C) is smaller than the fourth electrostatic capacitance C4 between the multiple second movable electrodes 12e and the multiple second fixed electrodes 22e when the second acceleration g2 is not applied (referring to FIG. 11A).

The absolute value of the difference between the fifth electrostatic capacitance C5 between the multiple first movable electrodes 11e and the multiple first fixed electrodes 21e when the second acceleration g2 is applied (referring to FIG. 11C) and the sixth electrostatic capacitance C6 between the multiple first movable electrodes 11e and the multiple first fixed electrodes 21e when the second acceleration g2 is not applied (referring to FIG. 11A) is less than the absolute value of the difference between the first electrostatic capacitance C1 and the second electrostatic capacitance C2. The sixth electrostatic capacitance C6 may be substantially the same as the second electrostatic capacitance C2.

The absolute value of the difference between the seventh electrostatic capacitance C7 between the multiple second movable electrodes 12e and the multiple second fixed electrodes 22e when the first acceleration g1 is applied (referring to FIG. 11B) and the eighth electrostatic capacitance C8 between the multiple second movable electrodes 12e and the multiple second fixed electrodes 22e when the first acceleration g1 is not applied (referring to FIG. 11A) is less than the absolute value of the difference between the third electrostatic capacitance C3 and the fourth electrostatic capacitance C4. The eighth electrostatic capacitance C8 may be substantially the same as the fourth electrostatic capacitance C4.

The configuration described in reference to the sensor 110 is applicable to the sensor 120.

In the embodiments recited above, for example, the base body 50 includes silicon. The multiple electrodes (the multiple first movable electrodes 11e, the multiple second movable electrodes 12e, the multiple first fixed electrodes 21e, the multiple second fixed electrodes 22e, etc.) include, for example, silicon and a first element. The first element includes, for example, at least one selected from the group consisting of germanium, phosphorus, arsenic, antimony, boron, gallium, and indium. The first element is, for example, an impurity.

The embodiments may include the following configurations (e.g., technological proposals).

Configuration 1

A sensor, comprising:

a base body;

a first movable structure body including a plurality of first movable electrodes, a direction from the base body toward the plurality of first movable electrodes being aligned with a first direction, a distance between the base body and the plurality of first movable electrodes being changeable, a direction from one of the plurality of first movable electrodes toward an other one of the plurality of first movable electrodes being aligned with a second direction crossing the first direction; and a first fixed structure body including a plurality of first fixed electrodes, one of the plurality of first fixed electrodes being between the one of the plurality of first movable electrodes and the other one of the plurality of first movable electrodes, a first movable electrode length along the first direction of the one of the plurality of first movable electrodes being shorter than a first fixed electrode length along the first direction of the one of the plurality of first fixed electrodes.

Configuration 2

The sensor according to Configuration 1, wherein the one of the plurality of first fixed electrodes includes a first partial region and a second partial region, the first partial region overlaps the one of the plurality of first movable electrodes in the second direction, the second partial region does not overlap the one of the plurality of first movable electrodes in the second direction, and a first distance along the first direction between the base body and the first partial region is different from a second distance along the first direction between the base body and the second partial region.

Configuration 3

The sensor according to Configuration 1 or 2, wherein the first movable electrode length is not less than $1/10$ and not more than $99/100$ of the first fixed electrode length.

Configuration 4

The sensor according to any one of Configurations 1 to 3, wherein the first movable structure body further includes a first movable conductive portion, the first movable conductive portion is separated from the base body in the first direction, the plurality of first movable electrodes is held by the first movable conductive portion, and the first movable electrode length is shorter than a first movable conductive portion length along the first direction of the first movable conductive portion.

Configuration 5

The sensor according to Configuration 4, wherein the first movable structure body further includes a first fixed portion, the first fixed portion is fixed to the base body, and the first movable conductive portion is held by the first fixed portion.

Configuration 6

The sensor according to Configuration 5, wherein the first movable structure body further includes a first movable connection portion connecting the first fixed portion and the first movable conductive portion, the first movable connection portion is separated from the base body in the first direction, the first movable connection portion and the first movable conductive portion extend along the second direction, one end portion of the first movable connection portion is fixed to the first fixed portion, and an other end portion of the first movable connection portion is connected to the first movable conductive portion.

Configuration 7

The sensor according to Configuration 6, wherein the first movable structure body further includes a first movable structure portion, the other end portion of the first movable connection portion is connected also to the first movable structure portion, and a length of the first movable conductive portion along a third direction is different from a length of the first movable structure portion along the third direction, the third direction crossing a plane including the first direction and the second direction.

Configuration 8

The sensor according to Configuration 7, wherein the length of the first movable conductive portion along the third direction is longer than the length of the first movable structure portion along the third direction.

Configuration 9

The sensor according to any one of Configurations 1 to 8, further comprising a second movable structure body and a second fixed structure body, the second movable structure body including a plurality of second movable electrodes, a distance between the base body and the plurality of second movable electrodes being changeable, a direction from one of the plurality of second movable electrodes toward an other one of the plurality of second movable electrodes being aligned with the second direction, the second fixed structure body including a plurality of second fixed electrodes, one of the plurality of second fixed electrodes being between the one of the plurality of second movable electrodes and the other one of the plurality of second movable electrodes, a second fixed electrode length along the first direction of the one of the plurality of second fixed electrodes being shorter than a second movable electrode length along the first direction of the one of the plurality of second movable electrodes.

Configuration 10

The sensor according to Configuration 9, wherein the one of the plurality of second movable electrodes includes a third partial region and a fourth partial region, the third partial region overlaps the one of the plurality of second fixed electrodes in the second direction, the fourth partial region does not overlap the one of the plurality of second fixed electrodes in the second direction, and a third distance along the first direction between the base body and the third partial region is different from a fourth distance along the first direction between the base body and the fourth partial region.

Configuration 11

The sensor according to Configuration 9, wherein the second fixed electrode length is not less than $1/10$ and not more than $99/100$ of the second movable electrode length.

Configuration 12

The sensor according to any one of Configurations 9 to 11, wherein a first electrostatic capacitance between the plurality of first movable electrodes and the plurality of first fixed electrodes when a first acceleration is applied is smaller than a second electrostatic capacitance between the plurality of first movable electrodes and the plurality of first fixed electrodes when the first acceleration is not applied, a third electrostatic capacitance between the plurality of second movable electrodes and the plurality of second fixed electrodes when a second acceleration is applied is smaller than a fourth electrostatic capacitance between the plurality of second movable electrodes and the plurality of second fixed electrodes when the second acceleration is not applied, the second acceleration having a component in a reverse orientation of an orientation of the first acceleration, an absolute value of a difference between a fifth electrostatic capacitance and a sixth electrostatic capacitance is less than an absolute value of a difference between the first electrostatic capacitance and the second electrostatic capacitance, the fifth electrostatic capacitance being between the plurality of first movable electrodes and the plurality of first fixed electrodes when the second acceleration is applied, the sixth electrostatic capacitance being between the plurality of first movable electrodes and the plurality of first fixed electrodes when the second acceleration is not applied, and an absolute value of a difference between a seventh electrostatic capacitance and an eighth electrostatic capacitance is less than an absolute value of a difference between the third electrostatic capacitance and the fourth electrostatic capacitance, the seventh electrostatic capacitance being between the plurality of second movable electrodes and the plurality of second fixed electrodes when the first acceleration is applied, the eighth electrostatic capacitance being between the plurality of second movable electrodes and the plurality of second fixed electrodes when the first acceleration is not applied.

Configuration 13

The sensor according to any one of Configurations 1 to 3, further comprising a second fixed structure body including a plurality of second fixed electrodes, the first movable structure body including a first fixed portion, a first movable conductive portion, and a plurality of second movable electrodes, the first fixed portion being fixed to the base body, the first movable conductive portion being held by the first fixed portion, the plurality of first movable electrodes and the plurality of second movable electrodes being held by the first movable conductive portion, a distance between the base body and the plurality of second movable electrodes being changeable, a direction from one of the plurality of second movable electrodes toward an other one of the plurality of second movable electrodes being aligned with the second direction, the first movable conductive portion being between the plurality of first fixed electrodes and the plurality of second fixed electrodes in a third direction, the third direction crossing a plane including the first direction and the second direction, the first movable conductive portion being between at least a portion of the plurality of first movable electrodes and at least a portion of the plurality of second movable electrodes in the third direction, one of the plurality of second fixed electrodes being between the one of the plurality of second movable electrodes and the other one of the plurality of second movable electrodes, a second fixed electrode length along the first direction of the one of the plurality of second fixed electrodes being shorter than a second movable electrode length along the first direction of the one of the plurality of second movable electrodes.

Configuration 14

The sensor according to Configuration 13, wherein the one of the plurality of second movable electrodes includes a third partial region and a fourth partial region, the third partial region overlaps the one of the plurality of second fixed electrodes in the second direction, the fourth partial region does not overlap the one of the plurality of second fixed electrodes in the second direction, and a third distance along the first direction between the base body and the third partial region is different from a fourth distance along the first direction between the base body and the fourth partial region.

Configuration 15

The sensor according to Configuration 14, wherein a first electrostatic capacitance between the plurality of first movable electrodes and the plurality of first fixed electrodes when a first acceleration is applied is smaller than a second electrostatic capacitance between the plurality of first movable electrodes and the plurality of first fixed electrodes when the first acceleration is not applied, a third electrostatic capacitance between the plurality of second movable electrodes and the plurality of second fixed electrodes when a second acceleration is applied is smaller than a fourth electrostatic capacitance between the plurality of second movable electrodes and the plurality of second fixed electrodes when the second acceleration is not applied, the second acceleration having a component in a reverse orientation of an orientation of the first acceleration, an absolute value of a difference between a fifth electrostatic capacitance and a sixth electrostatic capacitance is less than an absolute value of a difference between the first electrostatic capacitance and the second electrostatic capacitance, the fifth electrostatic capacitance being between the plurality of first movable electrodes and the plurality of first fixed electrodes when the second acceleration is applied, the sixth electrostatic capacitance being between the plurality of first movable electrodes and the plurality of first fixed electrodes when the second acceleration is not applied, and an absolute value of a difference between a seventh electrostatic capacitance and an eighth electrostatic capacitance is less than an absolute value of a difference between the third electrostatic capacitance and the fourth electrostatic capacitance, the seventh electrostatic capacitance being between the plurality of second movable electrodes and the plurality of second fixed electrodes when the first acceleration is applied, the eighth electrostatic capacitance being between the plurality of second movable electrodes and the plurality of second fixed electrodes when the first acceleration is not applied.

Configuration 16

The sensor according to Configuration 14 or 15, wherein the first movable structure body further includes a first fixed portion and a first movable connection portion, the first fixed portion is fixed to the base body, the first movable connection portion connects the first fixed portion and the first movable conductive portion, and the first movable connection portion is separated from the base body in the first direction.

Configuration 17

A sensor, comprising:

a base body;

a first movable structure body including a plurality of first movable electrodes, a direction from the base body toward the plurality of first movable electrodes being aligned with a first direction, a distance between the base body and the plurality of first movable electrodes being changeable, a direction from one of the plurality of first movable electrodes toward an other one of the plurality of first movable electrodes being aligned with a second direction crossing the first direction;

a first fixed structure body including a plurality of first fixed electrodes, one of the plurality of first fixed electrodes being between the one of the plurality of first movable electrodes and the other one of the plurality of first movable electrodes;

a second movable structure body including a plurality of second movable electrodes, a distance between the base body and the plurality of second movable electrodes being changeable, a direction from one of the plurality of second movable electrodes toward an other one of the plurality of second movable electrodes being aligned with the second direction; and a second fixed structure body including a plurality of second fixed electrodes, one of the plurality of second fixed electrodes being between the one of the plurality of second movable electrodes and the other one of the plurality of second movable electrodes, a first electrostatic capacitance between the plurality of first movable electrodes and the plurality of first fixed electrodes when a first acceleration is applied being smaller than a second electrostatic capacitance between the plurality of first movable electrodes and the plurality of first fixed electrodes when the first acceleration is not applied, a third electrostatic capacitance between the plurality of second movable electrodes and the plurality of second fixed electrodes when a second acceleration is applied being smaller than a fourth electrostatic capacitance between the plurality of second movable electrodes and the plurality of second fixed electrodes when the second acceleration is not applied, the second acceleration having a component in a reverse orientation of an orientation of the first acceleration, an absolute value of a difference between a fifth electrostatic capacitance and a sixth electrostatic capacitance being less than an absolute value of a difference between the first electrostatic capacitance and the second electrostatic capacitance, the fifth electrostatic capacitance being between the plurality of first movable electrodes and the plurality of first fixed electrodes when the second acceleration is applied, the sixth electrostatic capacitance being between the plurality of first movable electrodes and the plurality of first fixed electrodes when the second acceleration is not applied, an absolute value of a difference between a seventh electrostatic capacitance and an eighth electrostatic capacitance being less than an absolute value of a difference between the third electrostatic capacitance and the fourth electrostatic capacitance, the seventh electrostatic capacitance being between the plurality of second movable electrodes and the plurality of second fixed electrodes when the first acceleration is applied, the eighth electrostatic capacitance being between the plurality of second movable electrodes and the plurality of second fixed electrodes when the first acceleration is not applied.

Configuration 18

The sensor according to any one of Configurations 5 to 8, further comprising a first insulating portion, the first insulating portion being provided between the base body and the first fixed portion.

Configuration 19

The sensor according to any one of Configurations 1 to 18, wherein the base body includes silicon, the plurality of first movable electrodes and the plurality of first fixed electrodes include silicon and a first element, and the first element includes at least one selected from the group consisting of germanium, phosphorus, arsenic, antimony, boron, gallium, and indium.

Configuration 20

The sensor according to any one of Configurations 1 to 12, wherein an electrostatic capacitance between the plurality of first movable electrodes and the plurality of first fixed electrodes changes according to a change of the distance between the base body and the plurality of first movable electrodes.

According to the embodiments, a sensor that has a high detection capability can be provided.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in sensors such as base bodies, structures, conductive portions, electrodes, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all display devices practicable by an appropriate design modification by one skilled in the art based on the display devices described above as embodiments of the invention also are within the scope of the invention to the extent that the spirit of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A sensor, comprising:
a base body;
a first movable structure body including a plurality of first movable electrodes, a direction from the base body toward the plurality of first movable electrodes being aligned with a first direction, a distance between the base body and the plurality of first movable electrodes being changeable, a direction from one of the plurality of first movable electrodes toward an other one of the plurality of first movable electrodes being aligned with a second direction crossing the first direction;
a first fixed structure body including a plurality of first fixed electrodes, one of the plurality of first fixed electrodes being between the one of the plurality of first movable electrodes and the other one of the plurality of first movable electrodes;
a first movable electrode length along the first direction of the one of the plurality of first movable electrodes being shorter than a first fixed electrode length along the first direction of the one of the plurality of first fixed electrodes;
a second movable structure body;
a second fixed structure body; and
an intermediate connection portion,
wherein
the first movable structure body further includes a first movable conductive portion,
the first movable conductive portion is separated from the base body in the first direction,
the plurality of first movable electrodes are held by the first movable conductive portion,
the first movable structure body further includes a first fixed portion,
the first fixed portion is fixed to the base body,
the first movable conductive portion is held by the first fixed portion,
the first movable structure body further includes a first movable connection portion connecting the first fixed portion and the first movable conductive portion,
the first movable connection portion is separated from the base body in the first direction,
the first movable connection portion and the first movable conductive portion extend along the second direction,
one end portion of the first movable connection portion is fixed to the first fixed portion, and
an other end portion of the first movable connection portion is connected to the first movable conductive portion,
the second movable structure body includes a plurality of second movable electrodes, a distance between the base body and the plurality of second movable electrodes is changeable, a direction from one of the plurality of second movable electrodes toward an other one of the plurality of second movable electrodes is aligned with the second direction,
the second fixed structure body includes a plurality of second fixed electrodes, one of the plurality of second fixed electrodes is between the one of the plurality of second movable electrodes and the other one of the plurality of second movable electrodes,
the second movable structure body further includes a second movable conductive portion, the second movable conductive portion is separated from the base body in the first direction, the plurality of second movable electrodes are held by the second movable conductive portion, the second movable electrode length is shorter than a second movable conductive portion length along the first direction of the second movable conductive portion, the second movable structure body further includes a second fixed portion, the second fixed portion is fixed to the base body, the second movable conductive portion is held by the first fixed portion, the second movable structure body further includes a second movable connection portion connecting the second fixed portion and the second movable conductive portion, the second movable connection portion is separated from the base body in the first direction, the second movable connection portion and the second movable conductive portion extend along the second direction, one end portion of the second movable connection portion is fixed to the second fixed portion, and an other end portion of the second movable connection portion is connected to the second movable conductive portion, the intermediate connection portion is connected between the first movable connection portion and the second movable connection portion, the intermediate connection portion is fixed to the base body, a position of the intermediate connection portion in the second direction is between a position of the first movable connection portion in the second direction and a position of the second movable connection portion in the second direction.

2. The sensor according to claim 1, wherein the one of the plurality of first fixed electrodes includes a first partial region and a second partial region, the first partial region overlaps the one of the plurality of first movable electrodes in the second direction, the second partial region does not overlap the one of the plurality of first movable electrodes in the second direction, and a first distance along the first direction between the base body and the first partial region is different from a second distance along the first direction between the base body and the second partial region.

3. The sensor according to claim 1, wherein the first movable electrode length is not less than $1/10$ and not more than $99/100$ of the first fixed electrode length.

4. The sensor according to claim 1, wherein the first movable electrode length is shorter than a first movable conductive portion length along the first direction of the first movable conductive portion.

5. The sensor according to claim 1, wherein the first movable structure body further includes a first movable structure portion, the other end portion of the first movable connection portion is connected also to the first movable structure portion, and a length of the first movable conductive portion along a third direction is different from a length of the first movable structure portion along the third direction, the third direction crossing a plane including the first direction and the second direction.

6. The sensor according to claim 5, wherein the length of the first movable conductive portion along the third direction is longer than the length of the first movable structure portion along the third direction.

7. The sensor according to claim 1, wherein a second fixed electrode length along the first direction of the one of the plurality of second fixed electrodes is shorter than a second movable electrode length along the first direction of the one of the plurality of second movable electrodes.

8. The sensor according to claim 7, wherein the one of the plurality of second movable electrodes includes a third partial region and a fourth partial region, the third partial region overlaps the one of the plurality of second fixed electrodes in the second direction, the fourth partial region does not overlap the one of the plurality of second fixed electrodes in the second direction, and a third distance along the first direction between the base body and the third partial region is different from a fourth distance along the first direction between the base body and the fourth partial region.

9. The sensor according to claim 7, wherein the second fixed electrode length is not less than $1/10$ and not more than $99/100$ of the second movable electrode length.

10. The sensor according to claim 7, wherein a first electrostatic capacitance between the plurality of first movable electrodes and the plurality of first fixed electrodes when a first acceleration is applied is smaller than a second electrostatic capacitance between the plurality of first movable electrodes and the plurality of first fixed electrodes when the first acceleration is not applied, a third electrostatic capacitance between the plurality of second movable electrodes and the plurality of second fixed electrodes when a second acceleration is applied is smaller than a fourth electrostatic capacitance between the plurality of second movable electrodes and the plurality of second fixed electrodes when the second acceleration is not applied, the second acceleration having a component in a reverse orientation of an orientation of the first acceleration, an absolute value of a difference between a fifth electrostatic capacitance and a sixth electrostatic capacitance is less than an absolute value of a difference between the first electrostatic capacitance and the second electrostatic capacitance, the fifth electrostatic capacitance being between the plurality of first movable electrodes and the plurality of first fixed electrodes when the second acceleration is applied, the sixth electrostatic capacitance being between the plurality of first movable electrodes and the plurality of first fixed electrodes when the second acceleration is not applied, and an absolute value of a difference between a seventh electrostatic capacitance and an eighth electrostatic capacitance is less than an absolute value of a difference between the third electrostatic capacitance and the fourth electrostatic capacitance, the seventh electrostatic capacitance being between the plurality of second movable electrodes and the plurality of second fixed electrodes when the first acceleration is applied, the eighth electrostatic capacitance being between the plurality of second movable electrodes and the plurality of second fixed electrodes when the first acceleration is not applied.

11. The sensor according to claim 1, further comprising a first insulating portion,
the first insulating portion being provided between the base body and the first fixed portion.

12. The sensor according to claim 1, wherein
the base body includes silicon,
the plurality of first movable electrodes and the plurality of first fixed electrodes include silicon and a first element, and
the first element includes at least one selected from the group consisting of germanium, phosphorus, arsenic, antimony, boron, gallium, and indium.

13. The sensor according to claim 1, wherein an electrostatic capacitance between the plurality of first movable electrodes and the plurality of first fixed electrodes changes according to a change of the distance between the base body and the plurality of first movable electrodes.

* * * * *